(12) United States Patent
Patterson

(10) Patent No.: US 8,190,523 B2
(45) Date of Patent: May 29, 2012

(54) ACCOUNT PERMANENCE

(75) Inventor: Barbara Patterson, South San Francisco, CA (US)

(73) Assignee: VISA U.S.A. Inc., San Francisco, CA (US)

( * ) Notice: Subject to any disclaimer, the term of this patent is extended or adjusted under 35 U.S.C. 154(b) by 0 days.

(21) Appl. No.: 13/072,436

(22) Filed: Mar. 25, 2011

(65) Prior Publication Data

US 2011/0238576 A1 Sep. 29, 2011

Related U.S. Application Data

(63) Continuation of application No. 12/205,069, filed on Sep. 5, 2008, now Pat. No. 7,937,324.

(60) Provisional application No. 60/972,088, filed on Sep. 13, 2007.

(51) Int. Cl.
G06Q 40/00 (2012.01)
(52) U.S. Cl. .......................... 705/40; 705/38
(58) Field of Classification Search ............... 705/40, 705/38
See application file for complete search history.

(56) References Cited

U.S. PATENT DOCUMENTS

| | | | |
|---|---|---|---|
| 5,883,810 | A | 3/1999 | Franklin et al. |
| 6,024,286 | A | 2/2000 | Bradley et al. |
| 7,380,710 | B2 | 6/2008 | Brown |
| 7,594,611 | B1 | 9/2009 | Arrington, III |
| 2001/0034702 | A1 | 10/2001 | Mockett et al. |
| 2002/0046092 | A1 | 4/2002 | Ostroff |
| 2003/0023552 | A1 | 1/2003 | Kight et al. |
| 2003/0080183 | A1 | 5/2003 | Rajasekaran et al. |
| 2006/0122931 | A1 | 6/2006 | Walker et al. |
| 2006/0124756 | A1 | 6/2006 | Brown |
| 2007/0170247 | A1 | 7/2007 | Friedman |
| 2008/0035738 | A1 | 2/2008 | Mullen |
| 2008/0201265 | A1 | 8/2008 | Hewton |
| 2009/0037333 | A1 | 2/2009 | Flitcroft et al. |

*Primary Examiner* — Thomas Dixon
*Assistant Examiner* — Benjamin S Fields
(74) *Attorney, Agent, or Firm* — Kilpatrick Townsend & Stockton LLP

(57) ABSTRACT

A system and method for using derived account identifiers. The derived account identifiers are associated with a single permanent account identifier. Each derived account identifier is associated with a communication channel or portable consumer device.

16 Claims, 6 Drawing Sheets

ACCOUNT PERMANENCE

CROSS REFERENCES TO RELATED APPLICATIONS

This patent application is a continuation of and claims priority to U.S. patent application Ser. No. 12/205,069, filed on Sep. 5, 2008, which claims priority to U.S. provisional patent application no. 60/972,088, filed on Sep. 13, 2007, which are herein incorporated by reference in their entirety for all purposes.

BACKGROUND

Transaction cards, such as credit cards, are used to conduct transactions such as payment transactions. A card can be presented in person in order to conduct a transaction (a "card present" transaction). The card can contain an account number. The account number could also be recited over the phone for mail order purchases (a "card not present" transaction). Now, with the rise of cellular telephones, the Internet, and various other communication channels and technologies, account numbers can be used in a number of different ways.

The ubiquity of card transactions and the ease with which they can be made using technology (including in card not present transactions) has led to increased opportunities for fraud. Once fraud has been discovered, the account in question may be suspended and the consumer is issued a new account. The technology does not exist, however, for issuing a replacement account and the means enabling the user to use the replacement account immediately. Instead, the issuance process may take some time, and during this period the consumer cannot use the account over any channel. For example, if a consumer's credit card number is stolen during a card not present transaction, for instance through the use of keylogging software illegally installed on the consumer's computer terminal, the consumer can use the credit card number neither in future card present nor card not present transactions.

Some cards have further identifying features, such as "verification values" or "card security codes." Verification values are 3- or 4-digit numbers that are printed on the face of a credit card. A verification value is often used in "card not present" transactions. If the verification value and the consumer's account number is stolen, then a thief may use this information to conduct purchases in card not present transactions, for instance transactions made through the Internet or by telephone.

Better methods to secure against fraud are desirable. Embodiments of the invention address these and other problems, individually and collectively.

BRIEF SUMMARY

Embodiments of the invention include assigning a single permanent account to a consumer, and having the consumer use derived account identifiers associated with a particular payment mechanism that the consumer is using. If one payment mechanism is compromised, other payment mechanisms are not compromised.

One embodiment of the invention is directed to a method comprising creating a plurality of derived account identifiers, wherein each derived account identifier is derived from a single permanent account identifier associated with a consumer, and wherein each derived account identifier is associated with a different payment mechanism; and providing the plurality of derived account identifiers to the consumer.

Another embodiment of the invention is directed to a computer readable medium comprising code for creating a plurality of derived account identifiers, wherein each derived account identifier is derived from a single permanent account identifier associated with a consumer, and wherein each derived account identifier is associated with a different payment mechanism; and code for providing the plurality of derived account identifiers to the consumer.

Another embodiment of the invention is directed to a method comprising using a first derived account identifier in a first transaction; using a second derived account identifier in a second transaction; wherein each of the first and second derived account identifiers is associated with a different payment mechanism, and wherein each of the plurality of derived account identifiers is derived from a single permanent account identifier.

Another embodiment of the invention is directed to a plurality of portable consumer devices comprising a first portable consumer device comprising a first derived account identifier; and a second portable consumer device comprising a second derived account identifier, wherein the first and second derived account identifiers are derived from a single permanent account identifier.

Another embodiment of the invention is directed to a method comprising receiving an authorization request message comprising a derived account identifier, wherein the first derived account identifier is associated with a specific payment mechanism, and wherein the derived account identifier is associated with a single permanent account identifier; determining the single permanent account identifier associated with the derived account identifier; and forwarding the authorization request message to an issuer using the single permanent account identifier.

Another embodiment of the invention is directed to a computer readable medium comprising code for receiving an authorization request message comprising a derived account identifier, wherein the derived account identifier is associated with a specific payment mechanism, and wherein the derived account identifier is associated with a single permanent account identifier; code for determining the single permanent account identifier associated with the derived account identifier; and code for forwarding the authorization request message to an issuer using the single permanent account identifier.

These and other embodiments of the invention are described in further detail below with reference to the drawings and the Detailed Description.

DETAILED DESCRIPTION

Figure 1:
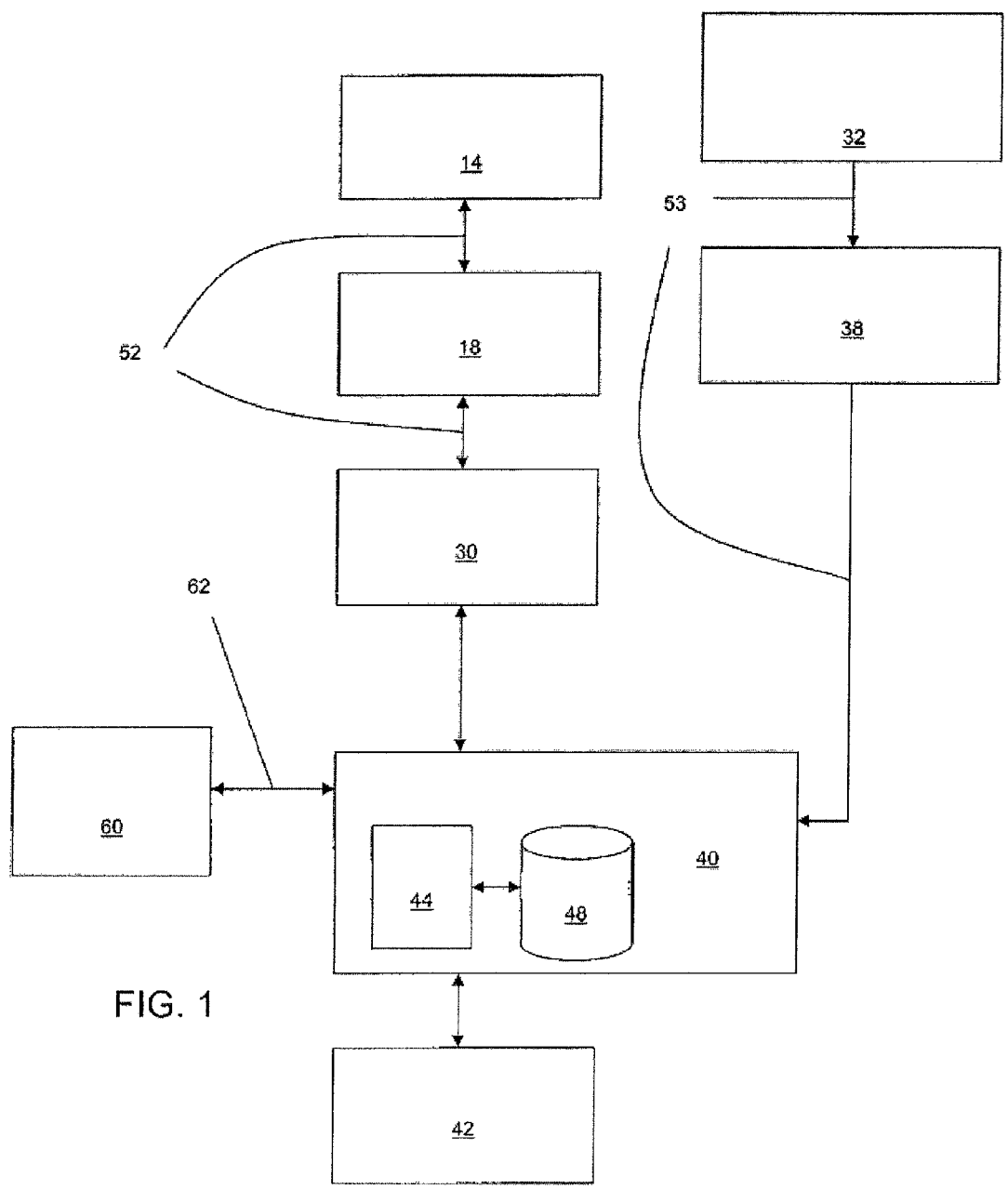
FIG. 1 is a block diagram of a system according to an embodiment of the invention.

Embodiments of the invention can be used in a transaction environment that contains multiple payment mechanisms. As used herein, a "payment mechanism" can mean the agency or means by which a transaction is produced or is accomplished. Payment mechanism may include all various communication channels and portable consumer devices. A transaction can occur over any payment mechanism. Examples of various payment mechanisms may include transactions over the Internet, transactions using a payment card such as a credit card, transactions conducted over a telephone, and the like.

A "communication channel" is a subcategory of payment mechanism, and may include various ways of conducting a transaction using different components and/or communication paths. Examples of various communication channels include a channel including an access device or point-of-sale (POS) terminal (such as with a credit card), a merchant, an acquirer associated with the merchant, a payment processing organization, and an issuer; a channel associated with payment over the Internet; a channel associated with cellular telephone network (e.g., where payment is made via a cellular phone), etc.

A "portable consumer device" is a subcategory of payment mechanism, and may include a specific device that is being used to conduct a payment transaction. "Portable consumer devices" may include key fobs, payment cards, wireless phones, etc. A more detailed description of portable consumer devices is provided below.

In a conventional process, an issuer would issue a consumer a payment card such as a credit card. It would have an account number, an expiration date and a CVV2 value associated with it. The account number, the expiration date, and the CVV2 value would be used for both card present and card not present transactions. It may also be used with the consumer's cellular phone if the consumer's cellular phone is used to conduct payment transactions.

In embodiments of the invention, a consumer is assigned a single permanent account identifier for an account. In certain embodiments, this identifier is not directly used to conduct transactions between the customer and merchants. It can be a permanent identifier the consumer can use to reference the consumer's account. When purchase transactions are conducted, the consumer can use derived account identifiers. Each payment mechanism that is used by the consumer can have its own, separate, derived account identifier. The derived account identifiers can be associated with the single permanent account identifier, but they may be different.

As used herein, a derived account identifier may be an account identifier that is associated with the single permanent account identifier. The derived account identifier may be associated to the single permanent account identifier through a look up table, by means of sharing certain characteristics, by means of manipulating the single permanent account identifier through mathematical or other formulas to create the derived account identifiers, or by other suitable means. In some embodiments, the permanent account identifier may include a permanent account number that does not change (e.g., 1234567812345678). Derived account identifiers may include one or more pieces of information associated with the permanent account identifier. For example, an exemplary first derived account identifier may include the permanent account number, a first expiration date, and a first verification value. An exemplary second derived account identifier may include the permanent account number, a second expiration date, and a second verification value.

In embodiments of the invention, consumers use each derived account identifier only in coordination with the associated payment mechanism. For example, a consumer may have a single permanent account identifier for a permanent account, and two derived account identifiers: a first one for use with a credit card (the credit card being an instance of a portable consumer device), and a second one for any "card not present" transactions, such as for making purchases over the Internet (the Internet being a communication channel). When the consumer uses the credit card for in-person purchases, such as at a POS terminal, the first derived account identifier on the card is used, and is linked to the permanent account so that any purchases made are debited from the permanent account. Likewise, when shopping over the Internet, the consumer can make purchases from Internet based stores by providing the second derived account identifier to the Internet based stores. Any purchases made in this fashion are debited from the permanent account.

In certain embodiments, each derived account identifier is intended to act much as typical card information currently does. As such, each derived account identifier can be used for multiple transactions or purchases, with different merchants. After each commerce transaction, the account associated with the single permanent account identifier can be adjusted to reflect the transactions. For example, purchases made using a first derived account identifier and a second account identifier can be added together so that a consumer sees only one monthly statement for purchases made using those account identifiers. In this fashion, the consumer may need to maintain only a single account that is linked to the single permanent account identifier, while having the security of using multiple derived account identifiers. Each derived account can expire at some pre-defined time and date, but typically that expiration date is at least several months from the issue date of the derived account identifier. The number of commerce transactions that each derived account is usable for is only limited by the expiration date, and the amount of money or credit limit in the consumer's account.

In embodiments of the invention, if a derived account identifier is intercepted during use and then used in a fraudulent manner, that derived account identifier can be cancelled and a replacement derived account identifier can be issued. The replacement derived account identifier can be associated with the same portable consumer device or communication channel as the cancelled identifier. In this way, the customer can continue making purchases using the channels that have not been compromised, even while waiting for the replacement derived account identifier.

Specific embodiments of the invention can be described with reference to FIGS. 1-7.

FIG. 1 shows a system according to an embodiment of the invention. Other systems according to embodiments of the invention may include fewer or more components than are specifically shown in FIG. 1.

FIG. 1 shows an access device 18, an acquirer 30, a payment processing network 40, and an issuer 42, in operative communication with each other. The acquirer 30 and issuer 42 can communicate through the payment processing network 40. A mobile gateway 38 may also be in communication with the issuer 42 via the payment processing network 40. A computer 60 (e.g., a personal computer) may also be in communication with the issuer 42 via the payment processing network 40.

The acquirer 30 may be a bank that is associated with the access device 18, and the issuer 42 may issue the first and second portable consumer devices 14, 32 to the consumer.

As used herein, an "acquirer" is typically a business entity, e.g., a commercial bank that has a business relationship with a particular merchant or other entity. An "issuer" is typically a business entity (e.g., a bank) which issues a portable consumer device such as a credit or debit card to a consumer.

Some entities can perform both issuer and acquirer functions. Embodiments of the invention encompass such single entity issuer-acquirers.

The payment processing network 40 may have a server computer 44, as well as a database 48. The server computer 44 is typically a powerful computer or cluster of computers. For example, the server computer can be a large mainframe, a minicomputer cluster, or a group of servers functioning as a unit. In one example, the server computer may be a database server coupled to a web server.

The payment processing network 40 may comprise or use a payment processing network such as VisaNet™. The payment processing network 40 and any communication network that communicates with the payment processing network 40 may use any other suitable wired or wireless network, including the Internet. The payment processing network 40 may be adapted to process ordinary debit or credit card transactions.

The server computer 44 may comprise or be associated with a computer readable medium comprising code for receiving a derived account identifier, and then determining the single permanent account identifier from the derived account identifier. The computer readable medium may also comprise code for using the single permanent account to route any authorization request message to the appropriate issuer 42.

For simplicity of illustration, one access device 18, one acquirer 30, and one issuer 42 are shown. However, it is understood that in embodiments of the invention, there can be multiple access devices, acquirers, issuers, as well as server computers, databases, accounts, etc.

Figure 2:
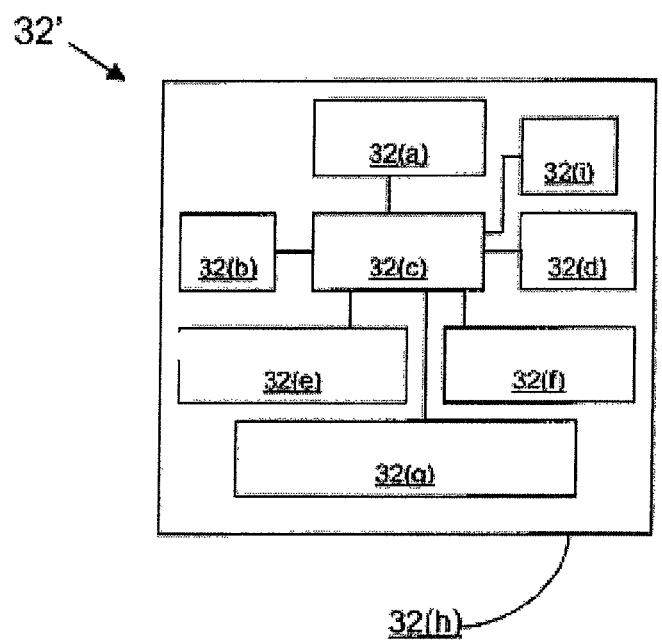
FIG. 2 is a block diagram of a portable consumer device that can be in the form of a phone.

An exemplary portable consumer device 32' in the form of a phone may comprise a computer readable medium and a body as shown in FIG. 2. (FIG. 2 shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32'.

In some embodiments, and regardless of the type of portable consumer device that is used, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a radio or cellular network may be applied to contactless element 32(g) by means of a contactless element interface (not shown). The contactless element interface functions to permit the exchange of data and/or control instructions between the mobile device circuitry (and hence the radio or cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32' and an interrogation device. Thus, the portable consumer device 32' is capable of communicating and transferring data and/or control instructions via both cellular network and near field communications capability.

The portable consumer device 32' may also include a processor 32(c) (e.g., a microprocessor) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit her voice through the portable consumer device 32'. The portable consumer device 32' may also include an antenna 32(a) for wireless data transfer (e.g., data transmission).

If the portable consumer device is in the form of a debit, credit, or smartcard, the portable consumer device may also optionally have features such as magnetic strips. Such devices can operate in either a contact or contactless mode.

Figure 3:
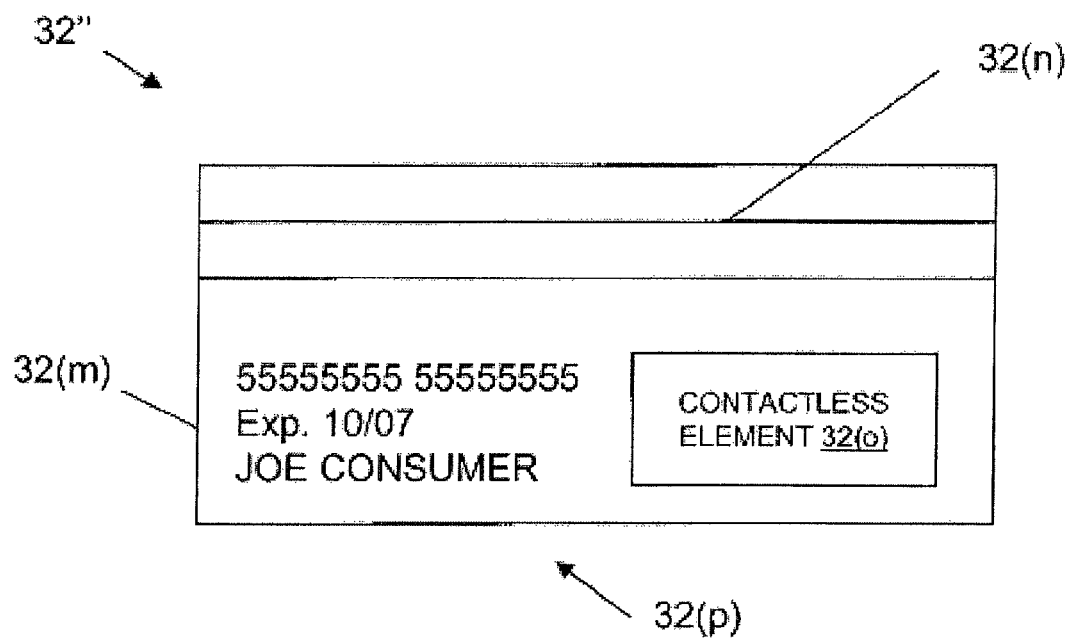
FIG. 3 is a block diagram of a portable consumer device in the form of a payment card.

An example of a portable consumer device 32" in the form of a card is shown in FIG. 3. FIG. 3 shows a plastic substrate 32(m). A contactless element 32(o) for interfacing with an access device 34 may be present on or embedded within the plastic substrate 32(m). Consumer information 32(p) such as an account number, expiration date, a verification value, and consumer name may be printed or embossed on the card. Also, a magnetic stripe 32(n) may also be on the plastic substrate 32(m).

As shown in FIG. 3, the portable consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32".

Figure 4:
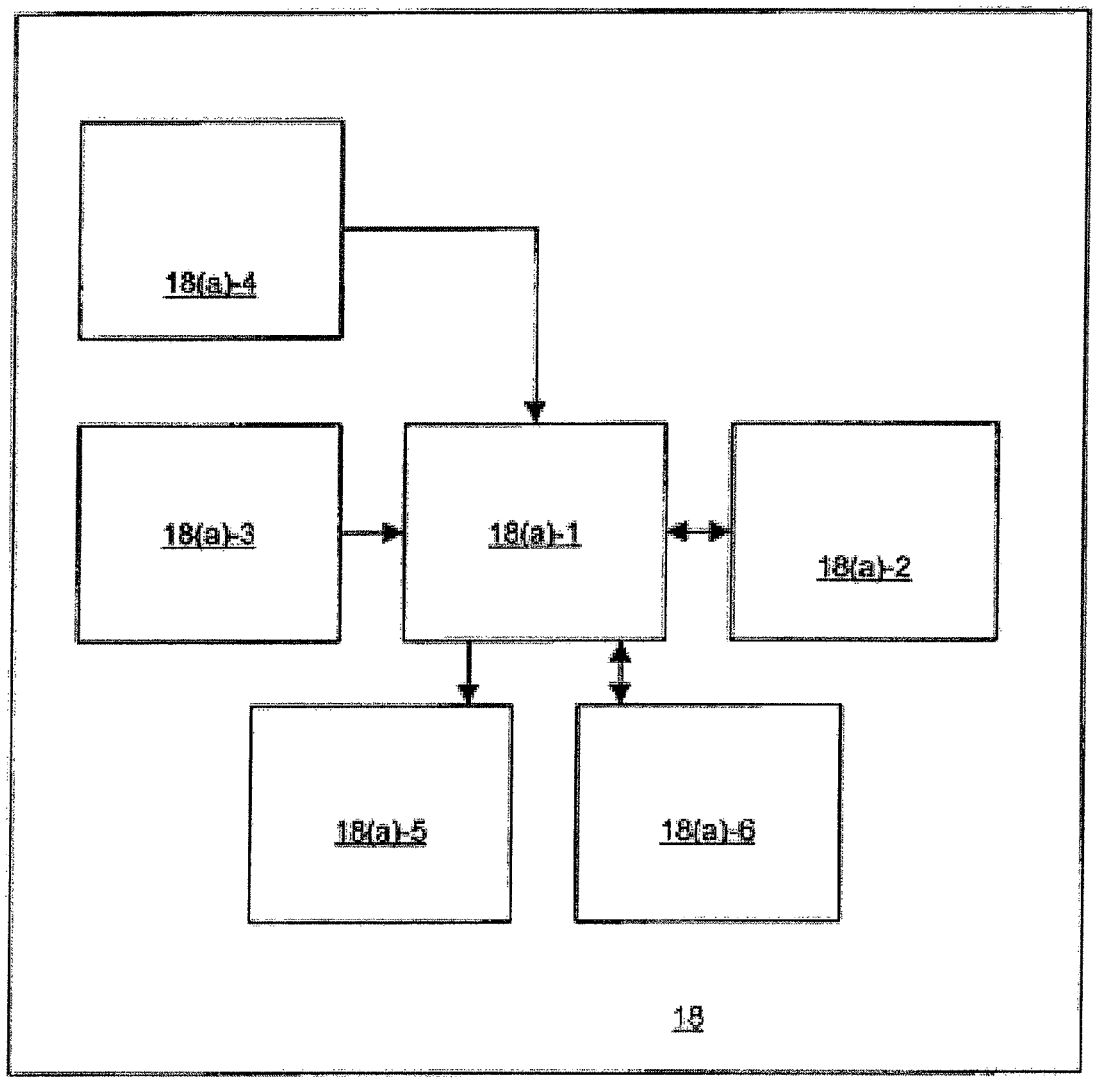
FIG. 4 is a block diagram of an access device according to an embodiment of the invention.

FIG. 4 shows a block diagram showing basic components that may reside in a POS terminal such as access device 18. An exemplary access device 18 may comprise a processor 18(a)-1, a computer readable medium 18(a)-2, a keypad 18(a)-3, a portable consumer device reader 18(a)-4, an output device 18(a)-5, and a network interface 18(a)-6, which can all be operatively coupled to the processor 18(a)-1. Exemplary portable consumer device readers can include RF (radio frequency) antennas, magnetic stripe readers, etc. that interact with the portable consumer device 32. Suitable output devices may include displays and audio output devices. Exemplary computer readable media may include one or more memory chips, disk drives, etc. The network interface 18(a)-6 may allow the access device 18 to send and receive messages from the acquirer 30, payment processing network 40, and/or the issuer 42.

Referring to FIG. 1, according to certain embodiments, each communications channel may be associated with a different derived account identifier. For example, a consumer may have three separate derived account identifiers, one each for a separate communications channel. The consumer may have a first derived account identifier for use with first communications channel 52. In this embodiment, the first communications channel 52 includes the path that is formed by access device 18, and acquirer 30. This communications channel is for purchases made in person. It comprises using a first portable consumer device 14, such as a credit card. First portable consumer device 14 will contain the first derived account identifier, and can be used for transactions in person, such as making purchases at a store.

The consumer may also have a second derived account identifier for use with second derived communications channel 53. In this embodiment, second communications channel 53 includes the path that is formed by mobile gateway 38. This communications channel is for purchases made with an electronic device such as second portable consumer device 32, which may be a cell phone. Second portable consumer device 32 can contain the second derived account identifier, and can be used for transactions.

The consumer may also have a third derived account identifier for use with third communications channel 62. In this embodiment, third communications channel comprises the Internet. This communications channel is for purchases made with devices (such as user computer 60) that are connected to the Internet. User computer 60 may contain the third derived account identifier in a memory storage, or the third derived account identifier may be input into user computer 60 separately for each transaction.

In the above embodiment, each derived account identifier can only be used with its associated channel (i.e., first derived account identifier can only be used with first communications channel 52, second derived account identifier can only be used with second communications channel 53, and third derived account identifier can only be used with third communications channel 62). As in the above example, if the consumer is at a store, this comprises first communications channel 52. As such, if she wishes to make a purchase, she would use first portable consumer device 14 (in this example, a credit card) containing the first derived account identifier, for that purchase. Likewise, if she wishes to make a purchase over the Internet (third communications channel 62), she would use the third derived account identifier.

In the above embodiment, if the first derived account identifier on the first portable consumer device 14 is used in an Internet transaction (i.e., over communication channel 62), that transaction can be rejected by the payment processing network 40 or the issuer 42. Likewise, even if the third derived account identifier is stolen by fraudulent actors while being used in an Internet transaction, it is unusable in any other channel. Commonly in fraud situations, the fraudulent actors will take stolen credit card information and create a physical card to use for in-person situations. In embodiments of the invention however, the third derived account identifier cannot be used in-person (i.e., it cannot be used with communication channel 52), and so any such transactions can be refused, preventing fraudulent purchases.

Referring to FIG. 1, according to other embodiments, each portable consumer device may be associated with a different derived account identifier derived from a single permanent account identifier associated with the consumer. For example, the first portable consumer device 14 may be a credit card and the second portable consumer device 32 may be a key-fob, and each may be associated with a separate derived account identifier.

In this example, the first portable consumer device 14 and the second portable consumer device 32 may be associated with first and second derived account identifiers. The first and second account identifiers may be derived from a single permanent account identifier associated with the consumer. Therefore in this example, the credit card 14 may contain or be associated with the first derived account identifier, and the key-fob 32 may contain or be associated with the second derived account identifier. In this embodiment, for the consumer to consummate a transaction, she must use a portable consumer device that contains the correct derived account identifier (i.e., the identifier that is associated with the portable device being used).

In alternative embodiments, several communication channels may share the same derived account identifiers and/or portable consumer devices. In one implementation, in FIG. 1, third communication channel 62 may be associated with a first derived account identifier, and the first and second communication channels 52 and 53 may be associated with a second derived account identifier. For example, third communication channel 62 may be for transactions that take place over the Internet. Using this third communication channel 62, the consumer inputs the first derived account identifier when making purchases. First and second communication channels 52 and 53 may be for transactions using a first portable consumer device 14 (such as a credit card) and a second portable consumer device 32 (such as a cellular telephone), respectively. Both the first portable consumer device 14 and the second portable consumer device 32 may contain the same second derived account identifier in this example.

Embodiments of the invention contemplate that different communication channels and portable consumer devices may contain various combinations of derived account identifiers as may be desirable. In other embodiments, a communication channel or portable consumer device may be associated with more than a single derived account identifier. For example, a consumer may be given several derived account identifiers, all for use in Internet transactions. Or the consumer may be provided with several credit cards, each containing a different derived account identifier. The amount of derived account identifiers provided to a consumer, and to which portable consumer devices and communication channels they are associated with, can vary depending on the needs of the issuer, the consumer, or the payment processing network.

Figure 5:
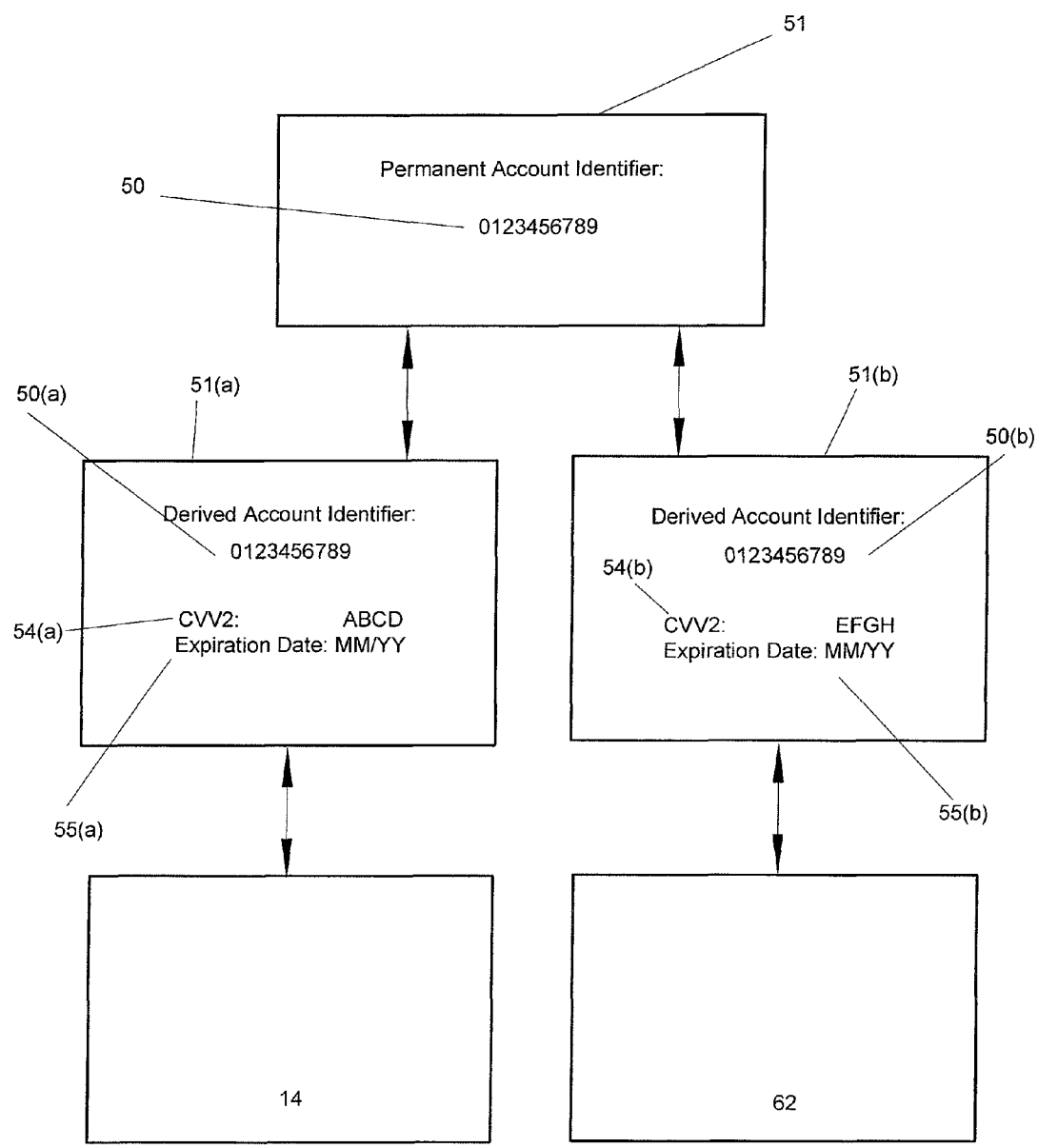
FIG. 5 is a diagram showing the relationship between a permanent account and derived accounts according to an embodiment of the invention.

FIG. 5 shows the relationship between derived account identifiers and a single permanent account identifier according to an embodiment of the invention, and how the derived account identifiers are created from the single permanent account identifier. This process of derivation is according to a preferred embodiment of the invention. Permanent account identifier 51 may include a base account number 50, which in this implementation is the numeral string 0123456789. The derived account identifiers in this example, each comprise three parts. First derived account identifier 51(a) comprises a first account number 50(a), which may be the same as the base account number 50, a first verification value 54(a), and a first expiration date 55(a). Second derived account identifier 51(b)

comprises a second account number 50(*b*), which may be the same as the base account number 50, a second verification value 54(*b*), and a second expiration date 55(*b*). In this embodiment, the base account numbers 50(*a*) and 50(*b*) of the first and second derived account identifiers 51(*a*), 51(*b*) are identical to the base account number 50 of the permanent account identifier 51. What has been varied is the other parts of the derived account identifiers 51(*a*), 51(*b*), namely the verification values (54(*a*) and 54(*b*)) and the expiration dates (55(*a*) and 55(*b*)). The parts of the derived identifiers may be assigned by the issuer or an organization associated with the payment processing network, once the base number 50 of the permanent account identifier 51 has been assigned. By way of example, expiration date 55(*a*) may be October, 2009, and expiration date 55(*b*) may be February 2010. Verification value 54(*a*) may be the number 012, and verification value 54(*b*) may be the number 789.

Each of the derived account identifiers is associated with its own communication channel or portable consumer device. Derived account identifier 51(*a*) can be associated with first communication channel 52, and derived account identifier 51(*b*) can be associated with second communication channel 62. Both 52 and 62 may be any type of channel. For example, as with FIG. 1, first communication channel 52 may be a channel for in person transactions, and second communications channel 62 may be for transactions that take place over the Internet. Transactions over communication channel 52 may be performed using a portable consumer device 14, such as a credit card. For transactions over this first communication channel 52, first account number 50(*a*) can be the same as the base account number 50, and the first verification value 51(*a*) and first expiration date 54(*a*) are printed on the portable consumer device 14. When the consumer wishes to make a transaction over the second communications channel 62, she can use the second derived account identifier 51(*b*). In this case, she can use base account number 50(*b*) as the credit card number that is requested by an Internet store, and enter the second verification value 54(*b*) and the second expiration date 55(*b*) onto any website forms, to make a purchase over the Internet.

Assigning each derived account identifier with a unique expiration date and verification value, while keeping the same base number as the single permanent account identifier, is a simple yet novel way to create many unique derived account identifiers that can all be associated with the single permanent account identifier. A credit card number with a missing or incorrect expiration date may not be accepted for use in purchase transactions. As such, even if one derived account identifier is discovered and used in fraudulent transactions, any other related derived account identifiers are not compromised.

In the embodiments discussed above, the derived account numbers and the base account number are the same. In other embodiments, the derived account numbers may be different than the base account number. In such embodiments, the derivation of derived account numbers from the permanent account identifier may occur using any other suitable process. The process of derivation can include combining numbers and letters together without alteration, manipulating numbers using a mathematical formula, etc. For example, a permanent account identifier such as 1234567812345678 may be altered to three different derived account identifiers by multiplying the permanent identifier by 3, 6, and 9, respectively and taking the 16 rightmost digits. The three derived numbers could be used for three different payment mechanisms that the consumer might use (e.g., a first one including a POS terminal, a second one using a mobile gateway, and a third one using an Internet connection.

In one exemplary embodiment, the payment processing network 40 may generate the single permanent account identifier and corresponding derived account identifiers. In this case, the derived account identifiers would be provided to the issuer 42. In another embodiment, issuer 42 may generate the single permanent account identifier and the derived account identifiers. The derived account identifiers would then be communicated to the payment processing network 40. In a further embodiment, issuer 42 may generate the single permanent account identifier and provide it to payment processing network 40. Payment processing network 40 would then create the associated derived account identifiers from the provided single permanent account identifier.

Figure 6:
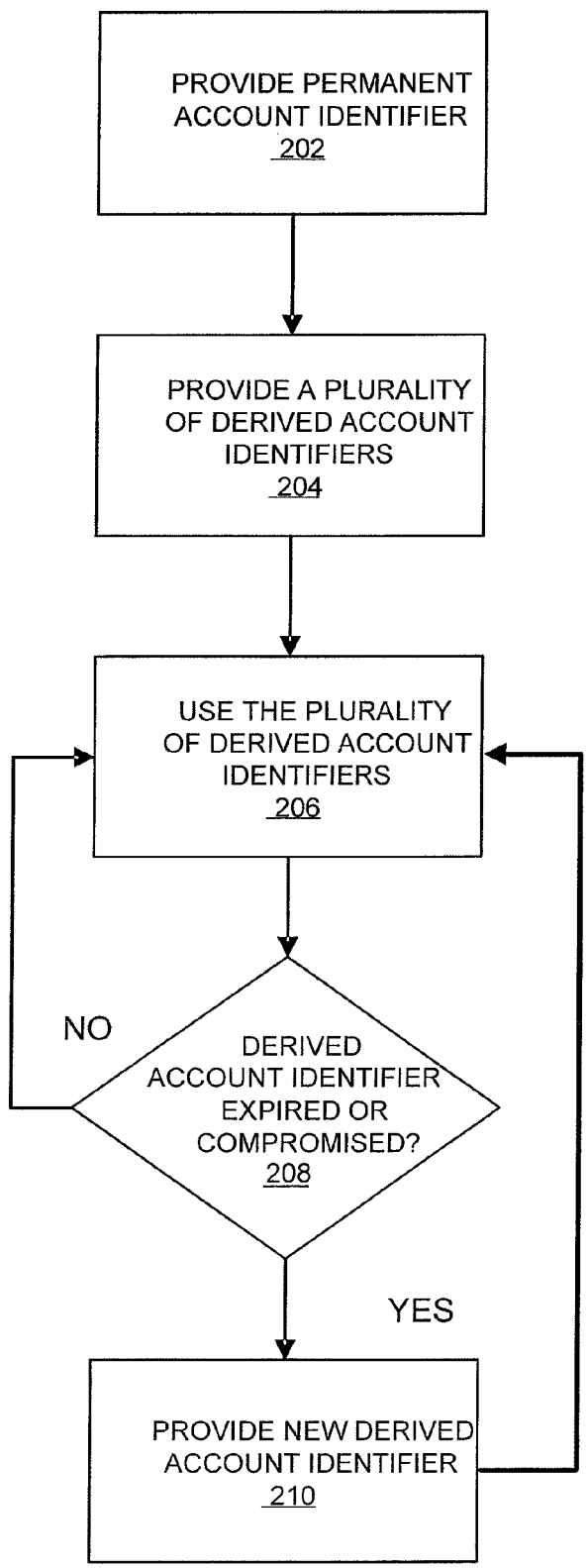
FIG. 6 is a flowchart illustrating a method according to an embodiment of the invention.

A method of performing an embodiment of the invention is detailed in FIG. 6. In step 202, an issuer or an organization associated with a payment processing network can generate a permanent account identifier, and assign the permanent account identifier to a consumer. This permanent account identifier may be used to reference the consumer's account with the issuer or organization. For example, the consumer may open up a credit card account with an issuer such as a bank. The bank will then generate a permanent account identifier and use that as the credit card account number. Then in step 204, the issuer or organization will generate, from the permanent account identifier, a plurality of different derived account identifiers for each of the communication channels and/or portable consumer devices that a consumer might use. These identifiers then will be provided to the consumer.

The derived account identifiers that have been generated are then associated with separate communication channels or portable consumer devices. For example, as explained above, a first derived account identifier can be assigned to a first portable consumer device, a second derived account identifier can be assigned to a second portable consumer device, and a third derived account identifier can be assigned for the consumer to use when the consumer uses a computer in a "card not present" type of transaction.

Each derived account identifier can then be used in conjunction with its associated communication channel or portable consumer device. The consumer can use any of the derived account identifiers that she was provided for commerce transactions, as seen in step 206 and as shown above.

The issuer or organization can monitor to see if any of the derived account identifiers have expired or been compromised. This is shown in step 208. If that answer is "No", i.e. none of the derived account identifiers have expired or been compromised, the consumer may keep using all of them as in step 206. If that answer is "Yes", i.e. a derived account identifier has expired or has been compromised, then the expired or compromised identifier may be cancelled and made unusable by the consumer. The issuer or organization can create a replacement derived account identifier to replace the cancelled ones in step 210, and associate them with the communication channels or portable consumer devices that had previously been associated with the cancelled derived account identifiers. Once this happens, the consumer may use the new derived account identifier in place of the cancelled one, as in step 206.

Figure 7:
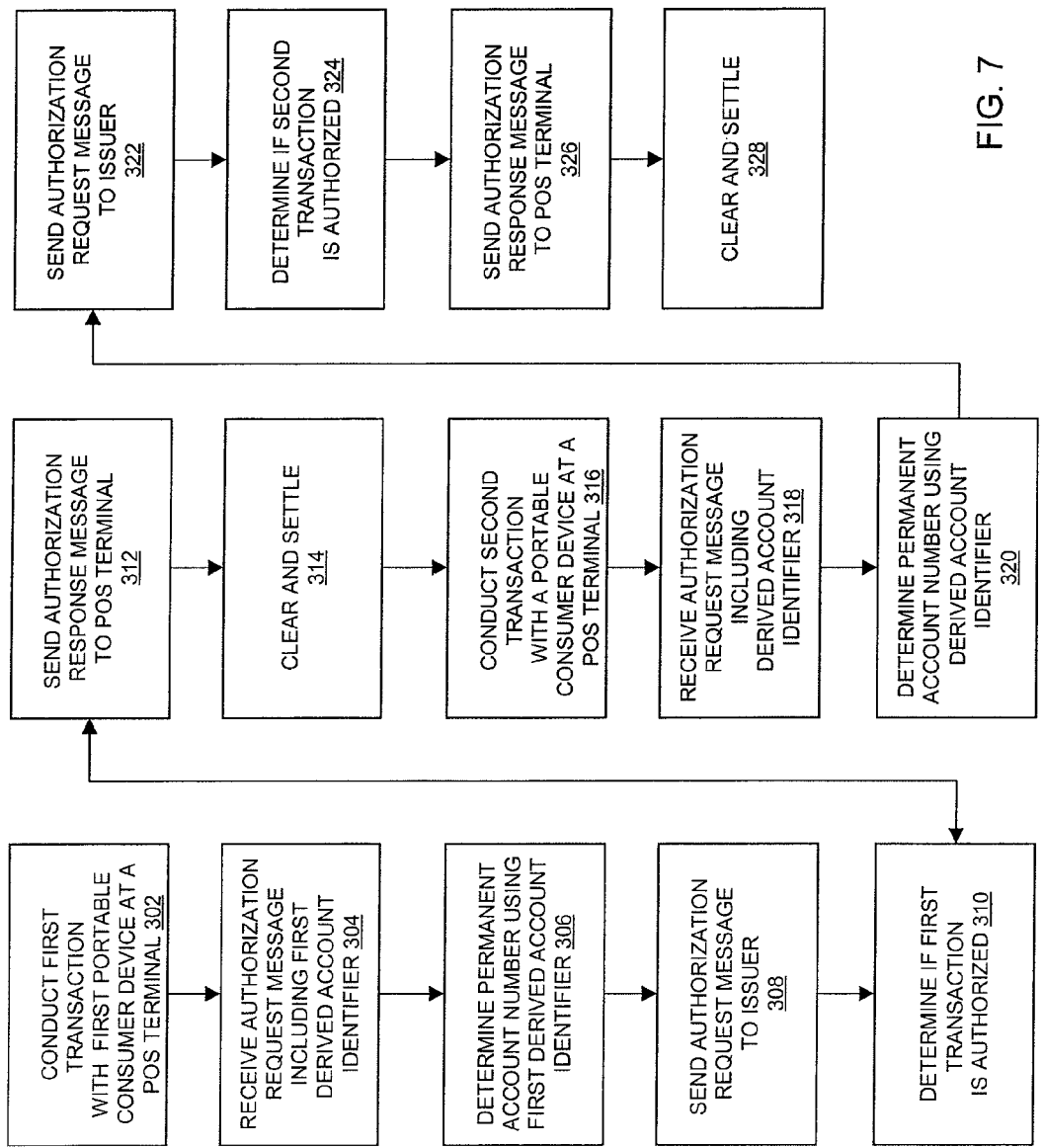
FIG. 7 is a flowchart illustrating a method according to an embodiment of the invention.

The method of using the invention according to one embodiment is shown in FIG. 7. The reference numbers used below refer to the steps in FIG. 7, and the components in FIG. 1. In this embodiment, a consumer has been assigned a single permanent account identifier, and has been provided with a plurality of derived account identifiers. Each derived account identifier is associated with a specific type or category of communication channel or portable consumer device. In step 302, the consumer can use a first portable consumer device 14 at a merchant that has a POS terminal (which is an example of access device 18). The first portable consumer device 14 may be in the form of a card. The first portable consumer device is associated with a first derived account identifier. The POS terminal can generate an authorization request message in step 304, which includes information in the first derived account identifier. It is then sent to the acquirer 30, and then to the payment processing network 40. A server computer 44 in the payment processing network 40 can then use a lookup table or the like in a database 48 to identify the single permanent account identifier associated with the first derived account identifier in Step 306. The single permanent account identifier may include the correct BIN or bank identification number for the issuer 42. In step 308, the payment processing network 40 then sends the authorization request message to the appropriate issuer 42.

Then, in step 310, the issuer 42 determines whether or not the transaction is authorized. The issuer 42 may authorize the transaction if there is sufficient credit and/or funds in the consumer's account. The issuer 42 may not authorize the transaction if there is insufficient credit or funds.

The issuer 42 then generates an authorization response message that is sent back to the POS terminal via the payment processing network 40, in step 312. During this step, the payment processing network 40 may convert the single permanent account identifier back to the first derived account identifier information. The authorization response message is received by the POS terminal, which can inform the consumer as to whether or not the transaction has been approved.

After the transaction is approved, a normal clearing and settlement process can take place, in step 314.

Then, the consumer may conduct a second transaction, at a POS terminal in step 316 using a second portable consumer device The second portable consumer device used in the second transaction can be associated with a second derived account identifier. For example, the second portable consumer device may be in the form of a wireless phone with a contactless communication element. The second transaction may be conducted with a second portable consumer device (and a second derived account identifier that is associated with the second portable consumer device). The POS terminal for the second transaction may be a different terminal from the one in the first transaction, or it may be the same terminal. The process for this second transaction is substantially similar to the process in the first transaction. In step 318, the POS terminal sends an authorization message that includes the derived account identifier used in the second transaction, to the payment processing network 40. The payment processing network determines the permanent account identifier in step 320, and forwards the authorization request message to the issuer 42 in step 322. The issuer 42 determines if the transaction is authorized in step 324, using the same criteria as in step 310.

The issuer 42 then generates an authorization response message that is sent back to the POS terminal via the payment processing network 40, in step 326. The authorization response message may include the derived account identifier used in the second transaction. It is then received by the POS terminal, which can inform the consumer as to whether or not the transaction has been approved. Clearing and settlement then takes place in step 328. Further transactions can subsequently be conducted using the same derived account identifier, or other derived account identifiers in the same manner (e.g., using an authorization request message) as described above in steps 302-328.

Embodiments of the invention have a number of advantages. For example, the permanent account number associated with the consumer is not exposed out in the open at any time in some embodiments. Further, even if one derived account identifier is compromised, the single permanent account identifier and the other derived account identifiers are not compromised. Also, this invention improves the ability of issuers to retain its holders (e.g., cardholders). In certain embodiments, the single permanent account identifier is not required to have an expiration date, and it is possible to keep the consumer associated with the account for life. Further, in embodiments of the invention, even if a derived account identifier associated with one channel or portable consumer device is cancelled, other account identifiers associated with other channels or devices may be used. Thus, the cancellation of one derived account identifier does not mean that all account identifiers become inactive.

Embodiments of the invention are not limited to the above-described embodiments. For example, although separate functional blocks are shown for an issuer, payment processing system, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A method comprising: creating, using a server computer, a plurality of derived account identifiers, wherein each derived account identifier is derived from a permanent account identifier associated with a consumer, wherein the plurality of derived account identifiers includes a first derived account identifier usable with a first payment mechanism, the first payment mechanism comprising a physical device, wherein the plurality of derived account identifiers further includes a second derived account identifier usable with a second payment mechanism, further wherein the first derived account identifier is not usable with the second payment mechanism and the second derived account identifier is not usable with the first payment mechanism; providing the plurality of derived account identifiers to the consumer; and providing a replacement derived account identifier if an account identifier in the plurality of derived account identifiers has expired or has been comprised, wherein if one of the derived account identifiers in the plurality of derived account identifiers is used fraudulently, any other derived account identifiers are not comprised.

2. The method of claim 1, wherein the plurality of payment mechanisms comprises a communication channel using a portable consumer device, a communication channel using a POS terminal, and a communication channel using a computer connected to the Internet.

3. The method of claim 1, wherein the permanent account identifier is not directly used to conduct transactions.

4. The method of claim 1, wherein the permanent account identifier and the derived account identifiers are in the form of different account numbers.

5. The method of claim 1, wherein the permanent account identifier comprises a base account identifier, and each derived account identifier comprises manipulating the base account identifier.

6. The method of claim 1, wherein the derived account identifiers in the plurality of account identifiers are manipulated using different methods for each different payment mechanism.

7. A server computer comprising a processor and a computer readable medium comprising code executable by the processor to implement a method, the method comprising: creating a plurality of derived account identifiers, wherein each derived account identifier is derived from a permanent account identifier associated with a consumer, wherein the plurality of derived account identifiers includes a first derived account identifier usable with a first payment mechanism, the first payment mechanism comprising a physical device, wherein the plurality of derived account identifiers further includes a second derived account identifier usable with a second payment mechanism, further wherein the first derived account identifier is not usable with the second payment mechanism and the second derived account identifier is not usable with the first payment mechanism; providing the plurality of derived account identifiers to the consumer; and providing a replacement derived account identifier if an account identifier in the plurality of derived account identifiers has expired or has been comprised, wherein if one of the derived account identifiers in the plurality of derived account identifiers is used fraudulently, any other derived account identifiers are not comprised.

8. A method comprising: using a plurality of derived account identifiers, including a first derived account identifier usable with a first payment mechanism, in a plurality of payment mechanisms, in a first transaction, the first payment mechanism comprising a physical device; using a second derived account identifier, in the plurality of derived account identifiers, usable with a second payment mechanism, in the plurality of payment mechanisms, in a second transaction, wherein the first derived account identifier is not usable with the second payment mechanism and the second derived account identifier is not usable with the first payment mechanism, and further wherein the first and second derived account identifiers are derived from a permanent account identifier associated with a consumer; and using a replacement derived account identifier if an account identifier in the plurality of derived account identifiers has expired or has been comprised, wherein if one of the derived account identifiers in the plurality of derived account identifiers is used fraudulently, any other derived account identifiers are not comprised.

9. The method of claim 8, wherein the first and second derived account identifiers include different account numbers.

10. The method of claim 8, wherein the first and second transactions are purchase transactions.

11. The method of claim 8, wherein the plurality of payment mechanisms comprises a communication channel using a portable consumer device, a communication channel using a POS terminal, and a communication channel using a computer connected to the Internet.

12. The method of claim 8, wherein the permanent account identifier is not directly used to conduct transactions.

13. A method comprising: receiving an authorization request message comprising a derived account identifier in a plurality of derived account identifiers, wherein the derived account identifier is usable with a payment mechanism, the payment mechanism comprising a physical device, further wherein the derived account identifier is associated with a permanent account identifier, wherein a replacement derived account identifier is used if an account identifier in the plurality of derived account identifiers has expired or has been comprised, and further wherein if one of the derived account identifiers in the plurality of derived account identifiers is used fraudulently, any other derived account identifiers are not comprised; determining the permanent account identifier associated with the derived account identifier; and forwarding the authorization request message to an issuer using the permanent account identifier.

14. The method of claim 13, wherein the authorization request message is a first authorization request message and the derived account identifier is a first derived account identifier usable with a first payment mechanism, and the method further comprising:
   receiving a second authorization request message comprising a second derived account identifier usable with a second payment mechanism, wherein the second derived account identifier is associated with the permanent account identifier, further wherein the first derived account identifier is not usable with the second payment mechanism and the second derived account identifier is not usable with the first payment mechanism; and
   forwarding the second authorization request message to the issuer using the permanent account identifier associated with the first and the second derived account identifiers.

15. The method of claim 13, further comprising:
   receiving an authorization response message from the issuer;
   converting the permanent account identifier back to the derived account identifier; and
   forwarding the authorization response message to a consumer associated with the permanent account identifier.

16. A server computer comprising a processor, and a computer readable medium comprising code executable by the processor to implement a method, the method comprising: receiving an authorization request message comprising a derived account identifier in a plurality of derived account identifiers, wherein the derived account identifier is usable with a payment mechanism, the payment mechanism comprising a physical device, and wherein the derived account identifier is associated with a permanent account identifier, wherein a replacement derived account identifier is used if an account identifier in the plurality of derived account identifiers has expired or has been comprised, and further wherein if one of the derived account identifiers in the plurality of derived account identifiers is used fraudulently, any other derived account identifiers are not comprised; determining the permanent account identifier associated with the derived account identifier; and forwarding the authorization request message to an issuer using the permanent account identifier.

* * * * *

UNITED STATES PATENT AND TRADEMARK OFFICE
CERTIFICATE OF CORRECTION

PATENT NO. : 8,190,523 B2  
APPLICATION NO. : 13/072436  
DATED : May 29, 2012  
INVENTOR(S) : Barbara Patterson Page 1 of 1

It is certified that error appears in the above-identified patent and that said Letters Patent is hereby corrected as shown below:

In the Claims:

In claim 1, column 13, line 14, please replace "comprised" with --compromised--;
In claim 1, column 13, line 17, please replace "comprised" with --compromised--;
In claim 7, column 13, line 54, please replace "comprised" with --compromised--;
In claim 7, column 13, line 57, please replace "comprised" with --compromised--;
In claim 13, column 14, line 31, please replace "comprised" with --compromised--;
In claim 13, column 14, line 34, please replace "comprised" with --compromised--;
In claim 16, column 15, line 6, please replace "comprised" with --compromised--;
In claim 16, column 16, line 2, please replace "comprised" with --compromised--.

Signed and Sealed this  
Sixteenth Day of July, 2013

Teresa Stanek Rea  
*Acting Director of the United States Patent and Trademark Office*